United States Patent Office 3,845,099
Patented Oct. 29, 1974

3,845,099
PARA PHENOXY CARBONYL PHENYL ESTER OF META ACETOXYBENZOIC ACID
James Economy, Eggertsville, and Bernard E. Nowak, Lancaster, N.Y., assignors to The Carborundum Company, Niagara Falls, N.Y.
No Drawing. Application Aug. 24, 1970, Ser. No. 66,566, now Patent No. 3,759,870, which is a continuation-in-part of abandoned application Ser. No. 619,577, Mar. 1, 1967. Divided and this application July 12, 1973, Ser. No. 378,761
Int. Cl. C07c 69/78
U.S. Cl. 260—473 R    1 Claim

ABSTRACT OF THE DISCLOSURE

A compound of the formula

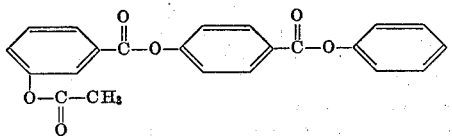

which is a monomer useful for the preparation of polyesters of alternating para- and meta-configuration.

BACKGROUND OF THE INVENTION

This is a division of copending application Ser. No. 66,566, filed Aug. 24, 1970, now U.S. Pat. 3,759,870, which is in turn a continuation-in-part of application Ser. No. 619,577, filed Mar. 1, 1967, now abandoned.

This invention relates to polyesters based on hydroxybenzoic acids, to monomers and dimers useful for the preparation thereof, and to processes for the preparation of said polyesters. Considerable difficulty has been encountered in attempting to prepare high molecular weight polyesters of hydroxybenzoic acids. Efforts have been made to prepare such polyesters by heating hydroxybenzoic acids by themselves, but at most slight polymerization occurs, although a somewhat greater degree of polymerization has been achieved by the use of certain condensation agents. Low molecular weight polymers containing only a few structural units in the molecular chain have been prepared by employing hydroxybenzoyl chlorides instead of the free acids as monomers.

Perhaps the most successful approach heretofore employed to obtain a greater degree of polymerization has been the use of acetoxybenzoic acids as monomers. According to this approach, para- or meta-acetoxybenzoic acid, or a mixture thereof, may be polymerized in the molten state, preferably in the presence of a suitable condensation catalyst, to form a polyester having the general formula

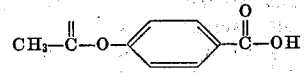

wherein the bracketed portion represents the recurring oxybenzoyl structural unit, which may be para- and meta-oxybenzoyl, or both within the same polyester molecule, depending upon the monomer or monomers used. Apparently as a result of the presence of the acetyl group in place of the hydroxylic hydrogen in the hydroxybenzoic acids, a substantial degree of polymerization is attainable by this method.

Since the foregoing method is based upon the use, as monomers, of hydroxybenzoic acids wherein the hydroxylic hydrogen is replaced by an acetyl group, the molecules of the resulting oxybenzoyl polyester terminate, at one end, with an acetoxy group. More particularly, however, it is to be noted that the molecules terminate at the other end with a free carboxyl group. While some such polyesters possess certain desirable properties, they also have decided disadvantages in several respects. For example, a homopolymer prepared from para-acetoxybenzoic acid by the foregoing method, which homopolymer may be referred to as a para-oxybenzoyl polyester terminating with an acetoxy group at one end and a free carboxyl group at the other end, is only moderately thermally stable, decomposing at temperatures about 350° C., and compression molding is virtually impossible with this material.

SUMMARY OF THE INVENTION

The present invention relates to a new and superior class of polyesters based on hydroxybenzoic acids, and to processes, monomers and dimers useful for the preparation thereof. In contrast to the method described above, the gist of the present invention is the use, as a monomer, of a hydroxybenzoic acid ester wherein the carboxylic hydrogen of the hydrobenzoic acid is replaced by a suitable aryl radical, to produce an oxybenzoyl polyester terminating at one end, not with a free carboxyl group, but with a carboaryloxy group. Additionally, the hydroxylic hydrogen of the monomer may, but need not, be replaced by a suitable acyl or aroyl group, thus the oxybenzoyl polyesters of this invention terminate, at the other end, with a hydroxyl, acyloxy or aroyloxy group. Accordingly, the polyesters of this invention may be termed oxybenzoyl polyesters terminating with a carboaryloxy group at one end and with a hydroxyl, acyloxy or aroyloxy group at the other end.

The basic process and the class of polyester products with which this invention is concerned may be represented by the following equation which generically illustrates the condensation of a monomer to a polyester according to the invention:

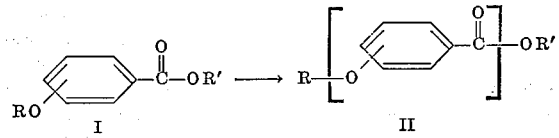

wherein: (1) the bracketed portion of the formula of the product represents the recurring oxybenzoyl structural unit of the polyester; (2) the oxy function of the product and the RO group of the monomer are attached to the ring in a position selected from among the para and meta positions to the carboxylic group; (3) a plurality of the recurring structural units are linked to form a linear polyester which terminates with RO at one end and COOR' at the other end; (4) R is selected from the group consisting of hydrogen, acetyl, propionyl and benzoyl; and (5) R' is selected from the group consisting of phenyl and substituted phenyl. Phenyl is especially preferred. Among the substituted phenyl groups which are highly desirable are phenyl groups wherein one or more hydrogens are replaced by halogen such as chlorine and/or lower alkyl having from 1 to 3 carbon atoms. The fact that the lines to the rings from the RO group in formula I and from the oxy function in formula II, respectively, intersect sides of the rings rather than being connected to specific apices thereof indicates, in a conventional manner, that the RO group in formula I may be para or meta with respect to the COOR' group, and that in formula II the oxy function may correspondingly be para or meta to the CO group or both within the same polyester molecule. Accordingly, the polyesters of the invention consist essentially of a chain of recurring structural units terminating at one end with a terminal group R and terminating at the other end with a terminal group OR', the recurring structural units being selected from the group consisting of para-oxybenzoyl units and meta-oxybenzoyl units and mixtures of such para- and meta-oxybenzoyl units in all proportions, and R and R' having the above-described meanings.

A general process for the production of the polyesters of this invention comprises condensing, in a liquid state at an elevated temperature, one or more monomers of the class defined by the generic formula I, above. The condensation may be carried out in the absence of a liquid heat transfer medium in the molten state, but it is advantageously carried out in a suitable high-boiling liquid heat transfer medium, which tends to render the polymerization more easily controllable.

The rate of condensation and the degree of polymerization achieved within a given time tend to increase with increasing temperature, with little or no polymerization occurring at room temperature. Accordingly, it will usually be advantageous to employ the highest practicable temperature in carrying out the condensation. The maximum temperature which may be used will be governed in part by the boiling or decomposition point of the particular monomer or monomers. This temperature limitation may be circumvented to some extent by employing a comparatively low temperature initially and increasing the temperature as condensation progresses with a concomitant decrease in the vapor pressure of the reaction mixture.

When a liquid heat transfer medium is employed, the maximum temperature at which the condensation may be carried out will be governed in part by the boiling point of the medium. The liquid heat transfer medium must be high-boiling, i.e. it must have a sufficiently high boiling point so as not to be dissipated by evaporation at the temperature and under the conditions employed in carrying out the condensation. Reactive liquids which interfere with the desired condensation should be avoided. In view of the interrelationship between temperature and condensation rate, liquids having comparatively high boiling points of 250° C. or higher are usually preferred to permit the condensation to be carried out at these temperatures at atmospheric pressure.

Numerous liquids have been found to be suitable as heat transfer media, among which may be mentioned the terphenyls; a eutectic mixture of 73.5 percent diphenyl oxide and 26.5 percent diphenyl, commercially available under the trademark Dowtherm A; and mixtures of various polychlorinated polyphenyls such as chlorinated biphenyls, of the variety typified by those commercially available under the trademark Therminol FR and until recently under the trademark Aroclor, which mixtures will be referred to herein as polychlorinated polyphenyls. A class of liquids which has been found to be eminently suitable, by virtue of the high boiling range thereof, comprises polyphenyl ethers and other polyaromatic ethers and mixtures thereof such as those composed of mixtures of meta and para isomers, having boiling ranges in excess of 400° C., typical representatives of which are available commercially under the trademark Therminol, for example Therminol 77. Such solvents will be referred to herein as polyaromatic ethers.

Although satisfactory condensations may often readily be achieved without the use of any catalyst, it is sometimes preferable to carry out the condensation in the presence of a catalytic amount of a suitable condensation catalyst, the condensation rate at any given temperature and the degree of polymerization attainable within a given period of time being increased thereby in some cases. Any of a number of known transesterification catalysts may be useful, including for example, sodium alkoxides, titanium alkoxides such as tetra-n-butyl orthotitanate, sodium titanium alkoxides, lithium hydroxide, magnesium and para-toluenesulfonic acid.

Polyesters may be prepared according to this invention which have molecular weights of 25,000 or more, and molecular weights averaging 10,000 or more are quite easily attainable. In general, the polyesters are characterized by extreme thermal stability. The precise properties of the various polyesters will depend upon such factors as molecular weight; the particular terminal groups; and the type of linkage between neighboring oxybenzoyl structural units, i.e. para, meta, or both, occurring within the polyester chain. While specific uses for any given polyester will depend to some extent upon the properties thereof, as will the feasible fabrication techniques which may be employed in using them, the polyesters of this invention have a wide range of utility. For example, they may be used to prepare polyester fibers, films and coatings having excellent high temperature properties. They may be used as bonding agents for abrasive products. They may be compression molded, employing conventional techniques, to produce articles having exceptionally high flexural modulus values.

No definitive theory is here advanced as to the reason for the superior properties of the polyesters of this invention. However, it appears that the presence of a suitable aryl radical in place of the carboxylic hydrogen of the hydroxybenzoic acids improves the condensation reaction, apparently being more reactive. More importantly, however, it appears that the aryl radical as the end group of the polyester molecule serves to inhibit degradation and impart thermal stability, thereby overcoming some of the disadvantages presented by oxybenzoyl polyesters heretofore available. Furthermore, it appears that the aryl radical, as compared to, for example, an alkyl radical, imparts a higher degree of thermal stability to the monomer and polymer, rendering it possible to employ a higher condensation temperature and thereby achieve a higher degree of polymerization.

Various other aspects of the invention will be pointed out hereinafter. The following examples are intended to illustrate, and not to limit, the inventive concepts.

DESCRIPTION OF THE PREFERRED EMBODIMENTS

Example 1

A mixture of 856 g. of phenyl para-hydroxybenzoate, 0.015 g. of tetra-n-butyl orthotitanate and 1800 g. of a polychlorinated polyphenyl liquid heat transfer medium (b.p. 360–370° C.) is heated, with constant stirring and under an atmosphere of flowing nitrogen, at 170–190° C. for 4 hours and then at 340–360° C. for 10 hours. Early in this heating cycle the mixture becomes a homogeneous liquid. During the heating cycle condensation occurs, accompanied by the distillation of phenol, and the polyester which is produced thereby forms a precipitate. The mixture is cooled to room temperature and extracted with acetone to remove the polychlorinated polyphenyl heat transfer medium, and the product is dried overnight in vacuum at 60° C. A yield of 377 g. of polyester powder is obtained, consisting essentially of a para-oxybenzoyl polyester terminating with a hydroxyl group at one end and a carbophenoxy group at the other end.

End group analysis indicates that the polyester has an average molecular weight of over 12,000. The polyester is hydrolyzed by strong caustic to form para-hydroxybenzoic acid and a small amount of phenol, confirming the above-mentioned structure of the polyester. The polyester is extremely thermally stable; upon being subjected to a temperature increase of 6° C./minute in air it exhibits a total weight loss of less than 1 percent at 475° C. and less than 5 percent at 530° C.

Specimens prepared from the polyester powder by compression molding at 440° C. and 280 kg./sq. cm. and tested, in accordance with A.S.T.M. standards, exhibit the following properties: compressive strength (A.S.T.M. D–695) 2700 kg./sq. cm.; coefficient of linear thermal expansion (A.S.T.M. D–696) $5.1 \times 10^{-5}$; flexural modulus (A.S.T.M. D–790) 84,000 kg./cm. Excellent retention of hardness and strength properties is displayed at elevated temperatures.

The polyester appears to be of a predominantly crystalline nature. No crystalline melting point is detectable at temperatures up to 525° C., but the polyester will flow under the application of heat and pressure. This illustrates a unique property which appears to be a general characteristic of all para-oxybenzoyl polyesters of this invention, namely, that such polyesters, while they do not melt at a temperature below their high decomposition point, nonetheless will flow under the influence of heat and pressure. As a result of this unexpected and highly desirable feature, it is possible to employ a variety of simple, well-known fabricating methods with the extremely thermally stable polyesters of the invention. For example, such methods as plasma spraying, compression molding, impact molding and high speed extrusion may be advantageously employed to form films and molded and extruded articles having excellent high temperature properties. Various other well-known techniques such as the use of suitable plasticizers may be employed.

Example 2

A mixture of 214 g. of phenyl para-hydroxybenzoate, 0.022 g. of tetra-n-butyl orthotitanate and 428 g. of a polyaromatic ether (b.p. about 440° C.) is heated, with constant stirring, under an atmosphere of flowing nitrogen. The mixture becomes a homogeneous liquid as the temperature reaches about 175° C., and the temperature is further increased to 300–320° C. where it is held for 10.5 hours, during which time condensation occurs, accompanied by the distillation of phenol, and the resulting polyester precipitates. The mixture is cooled to room temperature, thoroughly extracted with acetone to remove the polyaromatic ether, and vacuum dried. A yield of 85.5 g. of a polyester which is substantially the same as that produced in Example 1 is obtained.

Example 3

A mixture of 3000 g. of phenyl para-hydroxybenzoate, 0.15 g. of tetra-n-butyl orthotitanate and 5000 g. of a polyaromatic ether (b.p. about 440° C.) is heated, with constant stirring, under an atmosphere of flowing nitrogen. The mixture becomes a homogeneous liquid as the temperature reaches about 175° C., and the temperature is further increased to 320–360° C., where it is held for 14.5 hours, during which time condensation occurs, phenol distills off, and the resulting polyester precipitates. The mixture is cooled to room temperature, thoroughly extracted with acetone to remove the polyaromatic ether, and vacuum dried. A yield of 1325 g. of polyester is obtained, the polyester being substantially the same as that produced in Example 1.

Example 4

A mixture of 662 g. of phenyl para-hydroxybenzoate and 0.030 g. of tetra-n-butyl orthotitanate is heated, with stirring and under an atmosphere of flowing nitrogen, to a temperature of 93° C. and further in accordance with the following schedule:

| Total elapsed time (hours) | Temperature (° C.) | Observations |
| --- | --- | --- |
| 0.0 | 93 | |
| 0.5 | 185 | Mixture is a complete melt. |
| 1.0 | 277 | Phenol distilling from mixture. |
| 1.25 | 307 | Product precipitating. |
| 1.50 | 335 | Product solidified; heat source removed. |

The mixture is cooled to room temperature and the solid mass is crushed to a fine powder, 360 g. thereof being obtained. The powder consists essentially of a para-oxybenzoyl polyester terminating with a carbophenoxy group at one end and a hydroxyl group at the other end, having an average molecular weight of about 2000 as determined by end group analysis.

The molecular weight of the polyester is increased by heating it at a pressure of 1 mm. to 250° C., and then gradually increasing the temperature to 350° C. over a period of 3 hours.

As may be seen from Example 4 condensations may be carried out according to the invention in the absence of a solvent in the molten state, by heating the selected monomer at a temperature in excess of its melting point and sufficiently high to cause condensation but not above the boiling or decomposition point of the monomer. As condensation progresses, accompanied by a decrease in the vapor pressure of the reaction mixture, the temperature may gradually be increased to further increase the degree of polymerization. It will usually be advantageous to carry out the condensation until a highly viscous but flowable mixture is obtained which solidifies upon cooling to room temperature. The resulting solid mass of polyester may be ground to a powder and, if desired, the molecular weight of the polyester may be increased by heating the powder.

Example 5

A mixture of 214 g. of phenyl para-hydroxybenzoate and 428 g. of a polyaromatic ether (b.p. about 440° C.), containing no catalyst, is heated, with stirring and under an atmosphere of flowing nitrogen until a homogeneous liquid forms and further to 327° C. where the temperature is held for 7 hours. During this time condensation occurs, accompanied by the distillation of phenol, and the resulting polyester precipitates. The reaction mixture is mixed with boiling acetone and the polyester precipitate is removed by filtration, washed thoroughly with boiling acetone and dried in air. A yield of 109 g. of polyester is obtained, the product being substantially the same as that produced in Example 1.

Example 6

A mixture of 53.5 g. of meta-cresyl para-hydroxybenzoate, 0.0219 g. of tetra-n-butyl orthotitanate and 324 g. of a high-boiling polychlorinated polyphenyl liquid heat transfer medium is heated, with constant stirring, under a nitrogen atmosphere for 7 hours at 280–300° C. The mixture becomes a homogeneous liquid as it is heated to this temperature. Condensation occurs, accompanied by the distillation of meta-cresol and precipitation of the polyester, a para-oxybenzoyl polyester terminating with a hydroxyl group at one end and a carbo-meta-cresoxy group at the other. The mixture is cooled to room temperature and extracted with petroleum ether to remove the polychlorinated poly-phenyl, and the product is dried in vacuum. A yield of 21 g. of polyester is obtained. End group analysis indicates that the polyester has a molecular weight of about 10,000.

Example 7

A mixture of 200 g. of phenyl para-acetoxybenzoate and 400 g. of a polyaromatic ether liquid heat transfer medium is heated, with constant stirring, under an atmosphere of flowing nitrogen until a homogeneous liquid forms and further to a temperature of 350° C. where it is held for 14 hours. During this time condensation occurs and phenyl acetate is collected as a distillate, the resulting polyester precipitating. The precipitate is washed with acetone to remove the polyaromatic ether and vacuum dried. A yield of 70 g. of polyester having substantially the same properties as the product of Example 1 is obtained, the polyester consisting essentially of a para-oxybenzoyl polyester terminating with an acetoxy group at one end and a carbo-phenoxy group at the other end.

Example 8

A mixture of 185 g. of phenyl para-benzoyloxybenzoate and 250 g. of a polyaromatic ether (b.p. about 440° C.) is heated, with constant stirring and under an atmosphere of flowing nitrogen, at 315–320° C. for 1 hour and 350°

C. for 3 hours. Early in this heating cycle the mixture becomes a homogeneous liquid. During the heating cycle condensation occurs, accompanied by distillation of phenyl benzoate, and the polyester which is produced thereby forms a precipitate. The mixture is cooled to 70° C., acetone is added, and the polyester is recovered by filtration, washed with acetone and dried in vacuum at 110° C. for 1 hour. A yield of 69 g. of polyester powder is obtained, consisting essentially of a para-oxybenzoyl polyester terminating with a benzoyloxy group at one end and a carbophenoxy group at the other end.

Example 9

Meta-chlorophenyl para-acetoxybenzoate is prepared by the reaction of 36 g. of para-acetoxybenzoic acid and 26 g. of meta-chlorophenol in a methylene chloride solution in the presence of 50 g. of dicyclohexylcarbodiimide.

A mixture of 11 g. of meta-chlorophenyl para-acetoxybenzoate and 100 g. of a polyaromatic ether is heated, with stirring, under a nitrogen atmosphere to 320–340° C. The mixture becomes a homogeneous liquid during the heating. The temperature is held at 320–340° C. for 8 hours, during which time condensation occurs, meta-chlorophenyl acetate distills off and the polyester which forms precipitates. The mixture is cooled to room temperature, washed repeatedly with a mixture of trichloroethylene and petroleum ether to remove the polyaromatic ether, and the product is dried overnight at 50° C. in a vacuum oven. A yield of 3.1 g. of polyester is obtained consisting essentially of a para-oxybenzoyl polyester terminating with an acetoxy group at one end and a carbo-meta-chlorophenoxy group at the other end.

While the preceding examples describe the preparation of various homopolymers according to the invention, employing a single monomer, it is possible to employ two or more monomers in combination. For example, it is possible to produce polyesters having both para and meta linkages in the polymer chain by employing a monomer of the para type and a monomer of the meta type in combination, as described in Example 10. Combinations of two or more of the various monomers defined by the generic formula I, hereinabove, may be used, as may combinations of dimers such as those described hereinafter, or of monomers and dimers.

Example 10

A mixture of 500 g. of phenyl para-hydroxybenzoate, 25 g. of phenyl meta-hydroxybenzoate, 0.074 g. of lithium hydroxide and 1765 g. of a polychlorinated polyphenyl liquid heat transfer medium (b.p. 360–370° C.) is prepared. While stirring constantly and maintaining a flowing nitrogen atmosphere, the temperature of the mixture is raised until it becomes a homogeneous liquid, and then further increased to 300–320° C. where it is held for 6 hours, during which time condensation occurs, accompanied by the distillation of phenol and precipitation of the polyester which is produced. The mixture is cooled to room temperature and extracted with toluene to remove the polychlorinated polyphenyl, and the product is dried overnight at 150° C. in vacuum. A yield of 224 g. of polyester is obtained, the polyester having a molecular weight of about 4,000 and consisting essentially of an oxybenzoyl polyester terminating with a hydroxyl group at one end and a carbophenoxy group at the other end and having a polymer chain in which both para and meta linkages exist between the recurring oxybenzoyl structural units.

It has been found that the presence of alkali and alkaline earth metals in the polyesters of this invention may tend to interfere with the thermal stability thereof. It is therefore, generally desirable to remove the small amounts of catalyst which may be found in the product when such catalysts as lithium hydroxide are employed, prior to using the polyester. This is readily accomplished by washing the polyester powder with a dilute hydrochloric acid or other mineral acid.

One or more monomers of the para configuration may be co-condensed with one or more monomers of the meta configuration to produce a copolyester having both para- and meta-oxybenzoyl structural units in the chain, as illustrated in Example 10. It will also be apparent that a plurality of monomers of the para configuration may be co-condensed, if desired, to form a polyester having a chain containing only para-oxybenzoyl structural units. However, there is seldom any advantage to this procedure, since substantially the same result may be obtained with a single monomer, and the use of a plurality of para configuration monomers is often less convenient and more costly. The same considerations apply to co-condensation of a plurality of monomers of the meta configuration.

Copolymers containing any desired proportions of para- and meta-oxybenzoyl structural units may be produced by the method of Example 10, but it is difficult to achieve any precise predetermined arrangement of the structural units. Depending upon the particular para and meta monomers employed and various other factors, there may be a tendency of the para and meta structural units first to form blocks with other structural units of the same type, which blocks then combine in the polyester chain. Alternatively, there may be a tendency for the meta and para structural units to link in a more random fashion. Some control over the arrangement of para and meta linkages can be achieved, however, by adding one monomer to the other during the course of the condensation at a rate which is adjusted in accordance with the relative reactivities of the monomers.

In contrast to the para-oxybenzoyl homopolyesters of the invention, it appears that homopolymers of the meta type usually have a melting point which is below their decomposition range, and accordingly the meta-oxybenzoyl homopolyesters are suited to the various fabrication processes commonly employed with polymer melts. Moreover, because of the melting characteristics of the meta-oxybenzoyl polyesters, the incorporation of some meta-oxybenzoyl structural units in a predominantly para type polyester may have a desirable effect, e.g. by producing a polyester having not only the exceptional thermal stability which characterizes the para type of polyester but also having a melting point below the high decomposition range, which polyester is suited to extrusion from a melt and the various other fabrication techniques adapted to polymer melts, including the drawing of fibers by melt spinning.

Examples 11 and 12 illustrate one method whereby a substantial degree of control is had over the arrangement of para and meta linkages within a polyester molecule. According to this method an ester is formed from a monomer of the para type and a monomer of the meta type, and the ester is condensed to form a linear polyester having substantially alternating para and meta linkages.

Example 11

A solution of 2.14 g. (0.01 mole) of phenyl para-hydroxybenzoate and 1.8 g. (0.01 mole) of meta-acetoxybenzoic acid in 85 ml. of methylene chloride is prepared, and 2.1 g. (0.01 mole) of dicyclohexylcarbodiimide is added thereto with stirring. Upon standing at room temperature for about 16 hours dicyclohexylurea precipitates and is removed by filtration. The filtrate is evaporated to leave a paste, which is treated with 65 ml. of methanol to obtain the ester, (para-carbophenoxy) phenyl meta-acetoxybenzoate, in a solid form. The mixture is filtered and the product dried, a yield of 2.6 g. being obtained. After recrystallization from methanol the product has a melting point of 104–106° C.

The same ester may also be prepared via the Schotten-Baumann method, from meta-acetoxybenzoyl chloride and the sodium salt of phenyl para-hydroxybenzoate.

Example 12

A mixture of 180 g. of (para-carbophenoxy) phenyl meta-acetoxybenzoate, 0.022 g. of tetra-n-butyl orthotitanate and 400 g. of a polyaromatic ether (b.p. about 440° C.) is heated over a period of 3 hours to 350° C. with stirring and under a flowing nitrogen atmosphere, the mixture becoming a homogeneous liquid during the heating. The temperature is then maintained at 350–360° C. for 4 hours. Condensation occurs during the heating, accompanied by the distillation of phenyl acetate from the mixture. The resulting solution is cooled to room temperature and acetone is added, and the polyester which precipitates is recovered by filtration, washed with acetone and dried in vacuum. A yield of 81 g. of polyester is obtained, the polyester being a copolymer consisting essentially of alternating para- and meta-oxybenzoyl structural units terminating with an acetoxy group at one end and a carbophenoxy group at the other end. The copolymer has a softening point of about 220° C. and upon being subjected to a temperature increase of 6° C./minute in air shows no weight loss at 400° C.

Fibers are prepared from the polyester by placing the polyester in a metal vessel having an orifice with an inner diameter of 0.01 inch, and melt drawing onto a revolving spindle while maintaining the polyester in the molten state at 300° C.

While esters of the type employed in Example 12 are particularly useful to obtain polyesters with alternating para and meta linkages in the polymer chain, various dimers of the monomers described by the generic formula I are of general utility in preparing the polyesters of this invention, and may be used as starting materials instead of or in addition to the monomers, if desired.

One practical advantage of this feature is that it may render it unnecessary to employ monomers which are free of small amounts of dimeric material. For example, phenyl para-hydroxybenzoate may be prepared from para-hydroxybenzoic acid and phenol, the reaction being carried out in a solvent such as toluene in the presence of $POCl_3$, but quantities of the dimer, i.e. (para-carbophenoxy) phenyl para-hydroxybenzoate, may also be produced, as may small amounts of the trimer, tetramer, etc. While the dimer and higher ligomers might be isolated from the monomer and any one of these used independently as a starting material for condensation to a polyester, such separation is unnecessary and the mixture may be employed to obtain substantially the same product.

Although polyesters may be prepared in accordance with the invention which are of high molecular weight, lower molecular weight materials may easily be prepared, if desired, by employing lower condensation temperatures and/or shorter condensation times. Moreover, a specific application of this principle is based upon the fact that the solubility of the polyesters in most solvents tends to decrease with increasing molecular weight, and the higher molecular weight polyesters, especially those of the para type, are substantially insoluble in virtually all organic solvents, which precludes the use of certain fabricating techniques which require a solution of the polyester. This may be overcome by preparing and isolating a prepolymer, i.e. by carrying out the condensation to form a polyester having a low average molecular weight range, for example, from about 500 to about 2500. The preparation of such a prepolymer, or low molecular weight polyester, is set forth in Example 13. As further described in Example 13, such a prepolymer can be advanced to a high molecular weight in the solid state by heating it in a vacuum.

Preferably, however, the prepolymer will have a sufficiently low molecular weight as to be soluble in any suitable solvent so that a solution of the prepolymer may be employed in various fabricating operations, for example to coat a surface or to impregnate fibrous reinforcing material such as glass fibers. Thereupon, the solvent may be evaporated to leave the prepolymer, which can be advanced to a high molecular weight polyester by the application of heat, with or without the additional application of pressure or vacuum.

Example 13

A mixture of 500 g. of phenyl para-hydroxybenzoate, 0.0761 g. of lithium hydroxide and 1000 g. of a polychlorinated polyphenyl heat transfer medium is prepared. With constant stirring and a flowing nitrogen atmosphere, the mixture is heated until it becomes a homogeneous liquid and the temperature is further increased to 300–310° C. where it is held for 3 hours, during which time condensation occurs accompanied by the distillation of phenol and precipitation of the polyester which is produced. The mixture is cooled to room temperature and extracted with petroleum ether to remove the polychlorinated polyphenol, and the product is dried in vacuum at 60° C. A yield of 344 g. of para-oxybenzoyl polyester terminating with a hydroxyl group at one end and a carbophenoxy group at the other end is obtained. The polyester has an average molecular weight of the order of 2000.

The low molecular weight polyester powder is washed with dilute hydrochloric acid to remove the lithium hydroxide catalyst. On heating the polyester for 3 hours at 300° C. at a pressure of about 1 mm., a polyester having an average molecular weight substantially in excess of 10,000 is produced. The thermal stability of this material is indicated by the fact that, upon heating for 2.5 hours in air at 425° C., a weight loss of only about 6 percent results. The material can be compression molded at 450° C. and 20,000 p.s.i.

While the polyesters of this invention may be prepared by employing a monomer of the class defined by the generic formula I as the starting material for the condensation, there is often a significant commercial advantage in preparing the monomer from comparatively inexpensive raw materials, such preparation of the monomer being carried out in a liquid heat transfer medium which is suitable for the condensation reaction as well, thereby permitting condensation directly, without any need to isolate the monomer. For example, para-hydroxybenzoic acid and phenyl acetate may be reacted in a high-boiling polyaromatic ether, preferably in the presence of a suitable catalyst, at a temperature in the range of about 180–220° C., and polymerization of the resulting phenyl para-hydroxybenzoate to form a polyester may be carried out directly in substantial accordance with the methods set forth in the examples.

While the invention has been described with particular reference to certain specific and preferred embodiments, it will be obvious to those skilled in the art that many variations may be employed without substantially departing from the inventive concepts, and such variations are to be considered as a part of the present invention. For example, nitrogen is usually employed in carrying out the condensations to provide an inert atmosphere, thus avoiding oxidation of the materials present in the reaction mixture, but it will be apparent that other gases such as argon may be employed. Moreover, while an inert atmosphere is preferred for most condensation reactions of the invention, some such reactions may proceed in air without significant oxidation. The condensations are most conveniently carried out at about atmospheric pressure, but suitable pressure or vacuum systems may easily be devised. Various methods of recovering the polyester product from the condensation reaction mixture following condensation may be employed, but most conveniently, any of a wide variety of organic solvents is employed to remove the original heat transfer medium, if any was used, and to facilitate drying of the polyester.

End group analysis as mentioned herein refers to a method of determining the average molecular weight of a polyester according to which the polyester is saponified with sodium hydroxide, the end group and structural unit components are isolated separately, and the relative amounts of each are determined. The amount of end group component is determined by the addition of a suitable reagent followed by a colorimetric determination, the amount of structural unit component being determined by gravimetric analysis.

Except as otherwise specified, all references herein to percentages refer to percentages by weight.

We claim:

1. The compound (para-carbophenoxy) phenyl meta-acetoxybenzoate.

References Cited

UNITED STATES PATENTS

| | | | |
|---|---|---|---|
| 2,964,497 | 12/1960 | Kibler et al. | 260—473 R |
| 2,910,454 | 10/1959 | Clark et al. | 260—473 R |
| 3,186,968 | 6/1965 | Fertig et al. | 260—473 R |
| 3,772,250 | 11/1973 | Economy et al. | 260—47 CP |

OTHER REFERENCES

Beilstein: Band X, p. 85 (1927).

Beilstein: "Handbuch der Organischen Chemie," Zehnter Band (1927), p. 85.

LORRAINE H. WEINBERGER, Primary Examiner

J. F. TERAPANE, Assistant Examiner